(No Model.)
A. KÜHN.
SCAFFOLD FASTENER.
No. 534,111. Patented Feb. 12, 1895.
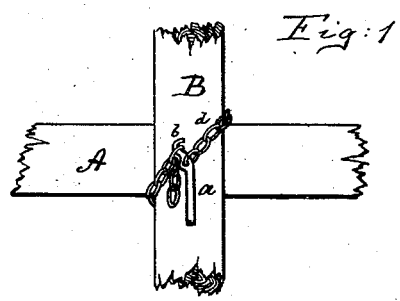
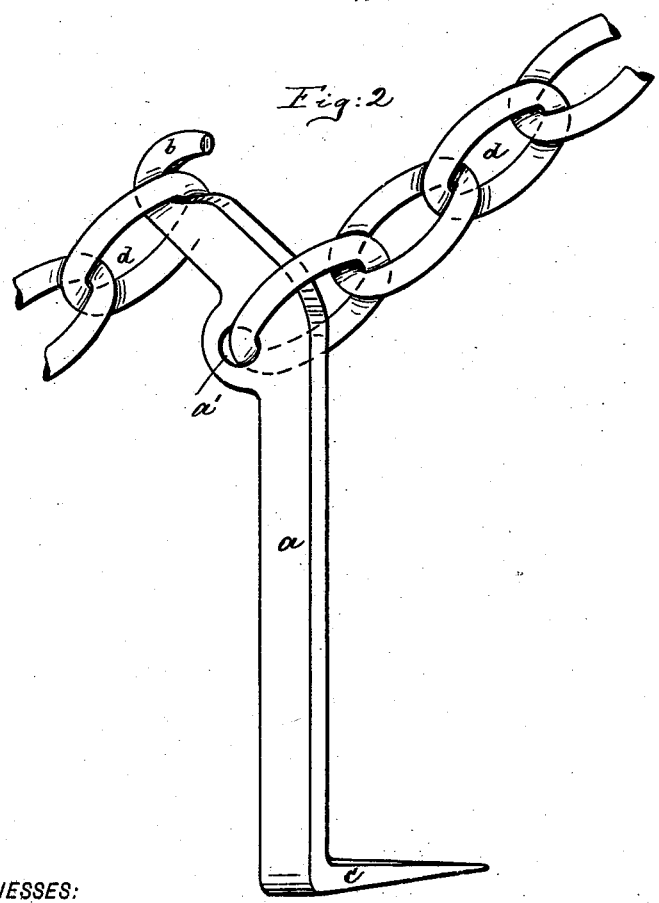
WITNESSES:
William Schulz
John Becker
INVENTOR
Albin Kühn
BY Roeder & Briesen
ATTORNEYS.

UNITED STATES PATENT OFFICE.

ALBIN KÜHN, OF HEIDELBERG, GERMANY.

SCAFFOLD-FASTENER.

SPECIFICATION forming part of Letters Patent No. 534,111, dated February 12, 1895.

Application filed January 23, 1894. Serial No. 497,755. (No model.)

*To all whom it may concern:*

Be it known that I, ALBIN KÜHN, of Heidelberg, Germany, have invented an Improved Scaffold-Fastener, of which the following is a specification, reference being had to the accompanying drawings, in which—

Figure 1 is a face view of my improved scaffold fastener, showing it in position. Fig. 2 is an elevation of the same on an enlarged scale.

The scaffold fastener consists of a bent shank or tightening lever $a$, provided at its upper end with a hook $b$, for attaching one end of a chain $d$, the other end of which is secured to the lever $a$, by an eye $a'$, at the bend. The lower end of lever $a$, is provided with a prong $c$.

In using the fastener, the poles A, B, to be connected are surrounded by the chain $d$, and then the chain is tightened and secured to hook $b$. The brace $a$, is moved up vertically to stretch the chain, and finally the prong $c$, is driven into the pole B. When my fastener is thus brought into position, the chain is properly tightened and cannot become spontaneously unhooked.

What I claim is—

A fastener composed of a bent lever having a prong at its lower end, a hook at its upper end and an eye at the bend, and of a chain adapted to engage the hook and eye, substantially as specified.

Signed at Mannheim, Germany, this 6th day of January, 1894.

ALBIN KÜHN.

Witnesses:
 A. B. BEYREUTHER,
 BENEDICT GOLDFINGER.